US011386899B2

(12) United States Patent
Lubold et al.

(10) Patent No.: US 11,386,899 B2
(45) Date of Patent: Jul. 12, 2022

(54) SYSTEM AND METHOD FOR PROVIDING REAL-TIME FEEDBACK OF REMOTE COLLABORATIVE COMMUNICATION

(71) Applicant: HONEYWELL INTERNATIONAL INC., Morris Plains, NJ (US)

(72) Inventors: Nichola Lubold, Glendale, AZ (US); Santosh Mathan, Seattle, WA (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 158 days.

(21) Appl. No.: 16/984,780

(22) Filed: Aug. 4, 2020

(65) Prior Publication Data

US 2022/0044683 A1  Feb. 10, 2022

(51) Int. Cl.
*G10L 15/24* (2013.01)
*G10L 25/63* (2013.01)
*G06F 3/01* (2006.01)

(52) U.S. Cl.
CPC .............. *G10L 15/24* (2013.01); *G06F 3/015* (2013.01); *G10L 25/63* (2013.01)

(58) Field of Classification Search
CPC .......... G10L 15/24; G10L 25/63; G06F 3/015
USPC ........................................................ 704/231
See application file for complete search history.

(56) References Cited

U.S. PATENT DOCUMENTS

| 7,106,204 B2 | 9/2006 | Pilu et al. |
| 9,622,660 B2 | 4/2017 | Le et al. |
| 9,641,681 B2 | 5/2017 | Nuta et al. |
| 9,763,592 B2 | 9/2017 | Le et al. |
| 9,867,548 B2 | 1/2018 | Le et al. |
| 10,152,899 B2 | 12/2018 | Vaughan et al. |
| 10,291,977 B2 | 5/2019 | Mackellar et al. |
| 2015/0310865 A1* | 10/2015 | Fay .................. G10L 15/22 704/254 |
| 2016/0111111 A1* | 4/2016 | Levitt ............... G10L 21/02 704/226 |

(Continued)

OTHER PUBLICATIONS

Pérez, A., Carreiras, M. & Duñabeitia, J.A. Brain-to-brain entrainment: EEG interbrain synchronization while speaking and listening. Sci Rep 7, 4190 (Jun. 23, 2017).*

(Continued)

*Primary Examiner* — Thuykhanh Le
(74) *Attorney, Agent, or Firm* — Lorenz & Kopf, LLP

(57) ABSTRACT

A system and method for providing real-time feedback of remote collaborative communication includes: processing first audio signals to extract first speech-related features therefrom; processing first EEG signals to extract first brain activity features therefrom; processing second audio signals to extract second speech-related features therefrom; processing second EEG signals to extract second brain activity features therefrom; processing the first and second speech-related features to determine if the speech from the first and second users exhibits positive or negative vocal entrainment; processing the first and second brain activity features to determine if the brain activity of the first and second users is aligned or misaligned; and generating feedback, on at least one display device, that indicates if the speech from the first and second users exhibits positive or negative vocal entrainment and if the brain activity of the first and second users is aligned or misaligned.

20 Claims, 4 Drawing Sheets

(56) References Cited

U.S. PATENT DOCUMENTS

| | | | | |
|---|---|---|---|---|
| 2017/0322679 | A1* | 11/2017 | Gordon | G06N 20/00 |
| 2018/0133431 | A1* | 5/2018 | Malchano | A61B 5/0036 |
| 2019/0200888 | A1* | 7/2019 | Poltorak | A61B 5/4836 |
| 2020/0286480 | A1* | 9/2020 | Singh | G10L 25/18 |
| 2021/0023332 | A1* | 1/2021 | Auger | A61B 5/165 |
| 2021/0110844 | A1* | 4/2021 | Miyake | G06V 40/172 |
| 2021/0287664 | A1* | 9/2021 | Bart | G10L 25/48 |
| 2021/0312923 | A1* | 10/2021 | Gaur | G10L 15/32 |

OTHER PUBLICATIONS

Lee, Chi-Chun, et al. "Computing vocal entrainment: A signal-derived PCA-based quantification scheme with application to affect analysis in married couple interactions." Computer Speech & Language 28.2 (Nov. 27, 2014): 518-539.*

Aftanas, L.I., "Human Anterior and Frontal Midline Theta and Lower Alpha Reflect emotionally Positive State and Internalized Attention: High-resolution EEG Investigation of Meditation," Neuroscience Letters 310, Jul. 12, 2001, 57-60.

L. Alem, F. Tecchia, and W. Huang, "HandsOnVideo: Towards a Gesture based Mobile AR System for Remote Collaboration," in Recent Trends of Mobile Collaborative Augmented Reality Systems, Springer New York, 2011, pp. 135-148.

S. D. ' Angelo and D. Gergle, "An Eye For Design: Gaze Visualizations for Remote Collaborative Work," Apr. 21, 2018.

E. Bartoli, L. Maffongelli, C. Campus, and A. D'Ausilio, "Beta Rhythm Modulation by Speech Sounds: Somatotopic Mapping in Somatosensory Cortex," Scientific Reports, vol. 6, Aug. 2016.

P. Boersma, "Praat, A System for Doing Phonetics by Computer," Glot International, vol. 5, Dec. 2001.

S. Borrie, N. Lubold, and H. Pon-Barry, "Disordered Speech Disrupts Conversational Entrainment: A Study of Acoustic-Prosodic Entrainment and Communicative Success in Populations with Communication Challenges.," Frontiers in Psychology, vol. 6, Aug. 2015, p. 1187, 2015.

K. A. Correa, B. T. Stone, M. Stikic, R. R. Johnson, and C. Berka, "Characterizing Donation Behavior from Psychophysiological Indices of Narrative Experience," Frontiers in Neuroscience, vol. 9, Aug. 2015.

Y. Dich, J. Reilly, and B. Schneider, "Using Physiological Synchrony as an Indicator of Collaboration Quality, Task Performance and Learning," in Lecture Notes in Computer Science (including subseries Lecture Notes in Artificial Intelligence and Lecture Notes in Bioinformatics), 2018, vol. 10947 LNAI, pp. 98-110.

G. Dumas, J. Nadel, R. Soussignan, J. Martinerie, and L. Garnero, "Inter-brain Synchronization During Social Interaction," PLoS One, vol. 5, No. 8, Aug. 2010.

F. Eyben, M. Wöllmer, and B. Schuller, "openSMILE—The Munich Versatile and Fast Open-Source Audio Feature Extractor Categories and Subject Descriptors," Proceedings of the 18th ACM international conference on Multimedia, Oct. 2010, pp. 1459-1462.

G. Gweon, M. Jain, J. McDonough, B. Raj, and C. P. Rose, "Predicting Idea Co-Construction in Speech Data Using Insights from Sociolinguistics," 10th Int. Conf. Learn. Sci. Futur Learn ICLS 2012—Proc., vol. 1, pp. 435-442, 2012.

K. Inanaga, "Frontal Midline Theta Rhythm and Mental Activity," Psychiatry and Clinical Neurosciences, vol. 52, No. 6, pp. 555-566, Jul. 1998.

S. Järvelä et al., "Enhancing Socially Shared Regulation in Collaborative Learning Groups: Designing for CSCL Regulation Tools," Education Tech Research Dev, vol. 63, pp. 125-142, Oct. 2014.

W. Klimesch, P. Sauseng, and S. Hanslmayr, "EEG Alpha Oscillations: The Inhibition-timing Hypothesis," Brain Research Reviews 53, Jun. 2006.

N. Lubold and H. Pon-Barry, "Acoustic-Prosodic Entrainment and Rapport in Collaborative Learning Dialogues Categories and Subject Descriptors," Proc. 2014 ACM Work. Multimodal Learn. Anal. Work. Gd. Chall., Nov. 2014.

H. Lubold, Nichola; Pon-barry, "A Comparison of Acoustic-Prosodic Entrainment in Remote and Face-to-Face Collaborative Learning Dialogues," pp. 288-293, Nov. 2014.

J. S. P. Macdonald, S. Mathan, and N. Yeung, "Trial-by-trial Variations in Subjective Attentional State are Reflected in Ongoing Prestimulus EEG Alpha Oscillations," Frontiers in Psychology, vol. 2, May 2011, pp. 1-16.

E. Montague, J. Xu, and E. Chiou, "Shared Experiences of Technology and Trust: An Experimental Study of Physiological Compliance Between Active and Passive Users in Technology-Mediated Collaborative Encounters," IEEE Transactions on Human-Machine System, vol. 44, No. 5, Oct. 2014.

M. Naeem, G. Prasad, D. R. Watson, and J. A. Kelso, "Electrophysiological Signatures of Intentional Social Coordination in the 10-12 Hz range," NeuroImage, vol. 59, pp. 1795-1803, Aug. 2011.

K. G. Niederhoffer and J. W. Pennebaker, "Linguistic Style Matching in Social Interaction," Journal of Language Social Psychology, vol. 21, No. 4, pp. 337-360, Dec. 2002.

L. M. Oberman, J. A. Pineda, and V. S. Ramachandran, "The Human Mirror Neuron System: A Link Between Action Cbservation and Social Skills," Social Cognitive Affect. Neuroscience, vol. 2, No. 1, pp. 62-66, Apr. 2006.

M. Otsuki, K. Maruyama, H. Kuzuoka, and Y. Suzuki, "Effects of Enhanced Gaze Presentation on Gaze Leading in Remote Collaborative Physical Tasks," Apr. 2018.

A. Perez, M. Carreiras, and J. Dunabeitia, "Brain-to-Brain Entrainment: EEG Interbrain Synchronization While Speaking and Listening," Scientific Reports, vol. 7, No. 1, Jun. 2017.

Pickering, MJ & Garrod, S 2004, 'The interactive-alignment model: Developments and refinements—Response' Behavioral and Brain Sciences, vol. 27, No. 2, pp. 212-225., 10.1017/S0140525X04450055.

H. J. Pijeira-Díaz, H. Drachsler, Sanna Järvelä, and Paul A. Kirschner, "Investigating Collaborative Learning Success with Physiological Coupling Indices Based on Electrodermal Activity," Proceedings of the Sixth International Conference on Learning Analytics & Knowledge, 2016.

W. J. Ray and H. W. Cole, "EEG Alpha Activity Reflects Emotional and Cognitive Processes," Science, vol. 228, pp. 750-752, Jun. 1985.

F. Singh, J. Pineda, and K. S. Cadenhead, "Association of Impaired EEG Mu Wave Suppression, Negative Symptoms and Social Functioning in Biological Motion Processing in First Episode of Psychosis," Schizophr. Res., vol. 130, No. 1, pp. 182-186, Aug. 2011.

S. Weiss and H. M. Mueller, "'Too Many Betas Do Not Spoil the Broth': The Role of Beta Brain Oscillations in Language Processing," Frontiers in Psychology, vol. 3, Jun. 2012.

Perez, Alejandro, et al., "Brain-to-Brain Entrainment: EEG Interbrain Synchronization While Speaking and Listening," Scientific Reports 7, Article No. 4190 (Jun. 2017).

Mukherjee, Sankar, et al., "The Neural Oscillatory Makers of Phonetic Convergence During Verbal Interaction," Aug. 5, 2018, wileyonlinelibrary.com/journal/hbm.

Lee, Chi-Chun, et al., "Computing Vocal Entrainment: A Signal-Derived PCA-Based Quantification Scheme with Application to Affect Analysis in Married Couple Interactions," Computer Speech and Language 28 (2014) 518-539, available online Jul. 6, 2012 at http://dx.doi.org/10.1016/j.csl.2012.06.006.

Dumas G, Nadel J, Soussignan R, Martinerie J, Garnero L (2010) Inter-Brain Synchronization during Social Interaction. PLoS ONE 5(8): e12166. doi:10.1371/journal.pone.0012166, published Aug. 17, 2010.

Dikker, Suzanne, et al., "Brain-toBrain Synchrony Tracks Real-World Dynamic Group Interactions in the Classroom," Current Biology Report 27, 1375-1380, May 8, 2017, http://dx.doi.org/10.1016/j.cub.2017.04.002.

* cited by examiner

SYSTEM AND METHOD FOR PROVIDING REAL-TIME FEEDBACK OF REMOTE COLLABORATIVE COMMUNICATION

TECHNICAL FIELD

The present invention generally relates to collaborative communication, and more particularly relates to systems and methods for providing real-time feedback of remote collaborative communication.

BACKGROUND

Throughout its history, aviation has relied on remote collaborative communications, such as between air traffic control (ATC) and aircraft pilots. With the advent of urban air mobility (UAM) and single pilot operations, there is an ever-increasing need for distributed individuals to work closely with one another and successfully collaborate. For example, scalable autonomy procedures for UAM propose a ground supervisor collaborating remotely with multiple operators in the air to ensure smooth navigation. Remote collaboration can be difficult to support and successfully achieve. This, in part, is because face-to-face collaboration is lacking. During face-to-face collaboration, individuals can rely on both conscious and unconscious behaviors to communicate, from language form and content, to facial expressions, body language, and speech signals. Furthermore, speakers can drive joint understanding by aligning and adapting these behaviors to one another over the course of a conversation. This adaptive alignment in collaboration is critical to social and cognitive outcomes, including rapport, trust, and success. During remote collaborations, the perceptual cues available when communicators are physically present become stilted or completely unavailable, and adaptive alignment is reduced. As a result, joint understanding and success often suffer.

Hence, there is a need for a system and method that provides real-time feedback of remote collaborative communication that improves joint understanding and communication between remote collaborators. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for providing real-time feedback of remote collaborative communication between a first user and a second user includes a processing system and is configured to extract a plurality of first speech-related features from first audio signals generated in response to speech supplied from the first user, and extract a plurality of first brain activity features from first electroencephalogram (EEG) signals generated in response to brain activity of the first user. The processing system is also configured to extract a plurality of second speech-related features from second audio signals generated response to speech supplied from the second user, and extract a plurality of second brain activity features from second EEG signals generated in response to brain activity of the second user. The processing system is configured to process the first and second speech-related features to determine if the speech from the first and second users exhibits positive or negative vocal entrainment, process the first and second brain activity features to determine if the brain activity of the first and second users is aligned or misaligned, and generate display commands that cause at least one display device to render feedback images that indicate (i) if the speech from the first and second users exhibits positive or negative vocal entrainment and (ii) if the brain activity of the first and second users is aligned or misaligned.

In another embodiment, a method for providing real-time feedback of remote collaborative communication is disclosed. The method includes: processing first audio signals to extract a plurality of first speech-related features therefrom; processing first electroencephalogram (EEG) signals to extract a plurality of first brain activity features therefrom; processing second audio signals to extract a plurality of second speech-related features therefrom; processing second EEG signals to extract a plurality of second brain activity features therefrom; processing the first and second speech-related features to determine if the speech from the first and second users exhibits positive or negative vocal entrainment; processing the first and second brain activity features to determine if the brain activity of the first and second users is aligned or misaligned; and generating feedback, on at least one display device, that indicates (i) if the speech from the first and second users exhibits positive or negative vocal entrainment and (ii) if the brain activity of the first and second users is aligned or misaligned.

In yet another embodiment, a system for providing real-time feedback of remote collaborative communication between a first user and a second user includes a first microphone, a plurality of first electroencephalogram (EEG) sensors, a second microphone, a plurality of second EEG sensors, and a processing system. The first microphone is configured to receive speech supplied from the first user and, in response thereto, supply first audio signals. The first EEG sensors are disposed on the first user and are configured to supply first EEG signals in response to brain activity of the first user. The second microphone is configured to receive speech supplied from the second user and, in response thereto, supply second audio signals. The second EEG sensors are disposed on the second user and are configured to supply second EEG signals in response to brain activity of the second user. The processing system is coupled to receive the first and second audio signals and the first and second EEG signals and is configured to: extract a plurality of first speech-related features from first audio signals; extract a plurality of first brain activity features from the first EEG signals; extract a plurality of second speech-related features from the second audio signals; extract a plurality of second brain activity features from the second EEG signals; process the first and second speech-related features to determine if the speech from the first and second users exhibits positive or negative vocal entrainment; process the first and second brain activity features to determine if the brain activity of the first and second users is aligned or misaligned; and generate display commands that cause at least one display device to render feedback images that indicate (i) if the speech from the first and second users exhibits positive or negative vocal entrainment and (ii) if the brain activity of the first and second users is aligned or misaligned.

Furthermore, other desirable features and characteristics of the system and method for providing real-time feedback of remote collaborative communication will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
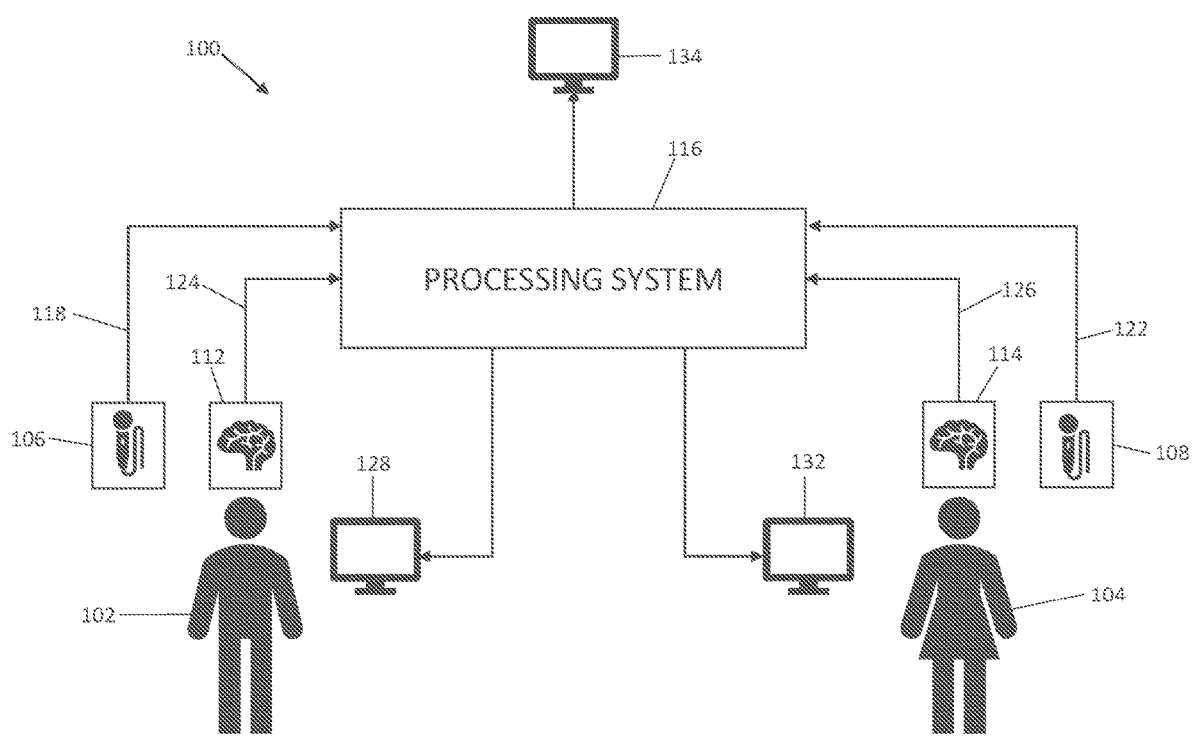
FIG. 1 depicts a functional block diagram of a system for providing real-time feedback of remote collaborative communication between a plurality of users.

Referring now to FIG. 1, a functional block diagram of a system 100 for providing real-time feedback of remote collaborative communication between a plurality of users is depicted. It should be noted that, for ease of depiction and description, only two users—a first user 102 and a second user 104—are depicted in FIG. 1. It will be appreciated, however, that the system 100 can be used for remote collaboration between more than two users.

The depicted system 100, in which only two users 102, 104 are included, includes a first microphone 106, a second microphone 108, a plurality of first electroencephalogram (EEG) sensors 112, a plurality of second EEG sensors 114, and a processing system 116. The first microphone 106 is configured to receive speech supplied from the first user 102 and is operable, in response thereto, to supply first audio signals 118. The second microphone 108 is configured to receive speech supplied from the second user 104 and is operable, in response thereto, to supply second audio signals 122. It will be appreciated that the first and second microphones 106, 108 may be implemented using any one of numerous devices, now known or developed in the future, that convert vocal induced pressure variations to electrical signals. Some non-limiting examples include any one of numerous dynamic microphones, condenser microphones, and contact microphones, just to name a few.

The first EEG sensors 112 are disposed on the first user 102 and are configured to supply first EEG signals 124 in response to the brain activity of the first user 102. The second EEG sensors 114 are disposed on the second user 104 and are configured to supply second EEG signals 126 in response to the brain activity of the second user 104. It will be appreciated that the first and second EEG sensors 112, 114 may be implemented using any one of numerous devices, now known or developed in the future, that convert senses brain activity into electrical signals. Some non-limiting examples include EEG sensor that employ passive, active, dry, or sponge (R-NET) electrodes, just to name few.

The processing system 116 may include one or more processors and computer-readable storage devices or media encoded with programming instructions for configuring the processing system 116. The one or more processors may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The processing system 116 is coupled to receive the first and second audio signals 118, 122 and the first and second EEG signals 124, 126. The processing system 116 is configured to extract a plurality of first speech-related features from first audio signals 118, and a plurality of second speech-related features from the second audio signals 118. The processing system 116 is configured to process the first and second speech-related features to determine if the speech from the first and second users 102, 104 exhibits positive or negative vocal entrainment.

Before proceeding further, it is noted that vocal entrainment is a known temporal phenomenon that has been shown to be one of several critical factors that impacts conversational success, including task success, rapport, and trust. Vocal entrainment can be positive, where the speakers are aligning and adapting to one another to become more similar over the course of a conversation, or it can negative, where the opposite is occurring.

Returning now to the description, to assess vocal entrainment, the first and second audio signals 118, 122 are transformed to allow for the speech-related feature extraction. The first and second speech-related features that the processing system 116 is configured to extract include, but are not limited to, extraction of pitch, speaking rate, intensity, jitter (pitch period length deviations), and shimmer (amplitude deviations between pitch period lengths). The processing system 116 may implement any one of numerous known techniques to extract the speech-related features. For example, the processing system 116 may use PRAAT or openSMILE, both of which are known computer programs for analyzing, synthesizing, and manipulating speech. PRAAT is disclosed, for example, in "PRAAT, a system for doing phonetics by computer," authored by P. Boersma, and published in *Glot Int.*, vol. 5, 2002, and openSMILE is disclosed, for example, in "openSMILE—The Munich Versatile and Fast Open-Source Audio Feature Extractor Categories and Subject Descriptors," authored by F. Eyben, M. Wöllmer, and B. Schuller, an published in *Proceedings of the*

The processing system 116 is also configured to extract a plurality of first brain activity features from the first EEG signals 124, and to extract a plurality of second brain activity features from the second EEG signals 126. The processing system 116 also processes the first and second brain activity features to determine if the brain activity of the first and second users 102, 104 is aligned or misaligned. It will be appreciated that the first and second brain activity features that the processing system 116 is configured to extract include, but are not limited to, alpha power and event related potentials (ERP). The processing system 116 may implement any one of numerous known techniques to extract the brain activity features. For example, the processing system 116 may use the techniques disclosed in "Trial-by-trial variations in subjective attentional state are reflected in ongoing prestimulus EEG alpha oscillations," authored by J. S. P. Macdonald, S. Mathan, and N. Yeung, and published in *Front. Psychol.*, vol. 2, pp. 1-16, May 2011, the entirety of which is incorporated herein by reference.

Regardless of the specific techniques used to extract the speech-related features and the brain activity features, the processing system 116 is additionally configured to process the first and second speech-related features to determine if the speech from the first and second users exhibits positive or negative vocal entrainment, and to process the first and second brain activity features to determine if the brain activity of the first and second users is aligned or misaligned. The processing system 116 may implement various known techniques to make these determinations. For example, the processing system 116 may determine if the speech from the first and second users exhibits positive or negative vocal entrainment by evaluating turn-by-turn feature similarity and increasing or decreasing alignment in terms of change over time across multiple speech features. Likewise, the processing system 116 may determine if the brain activity of the first and second users is aligned or misaligned by comparing the brain activity features via autocorrelation, analysis of short sequences, and comparison to established patterns.

Figure 2:
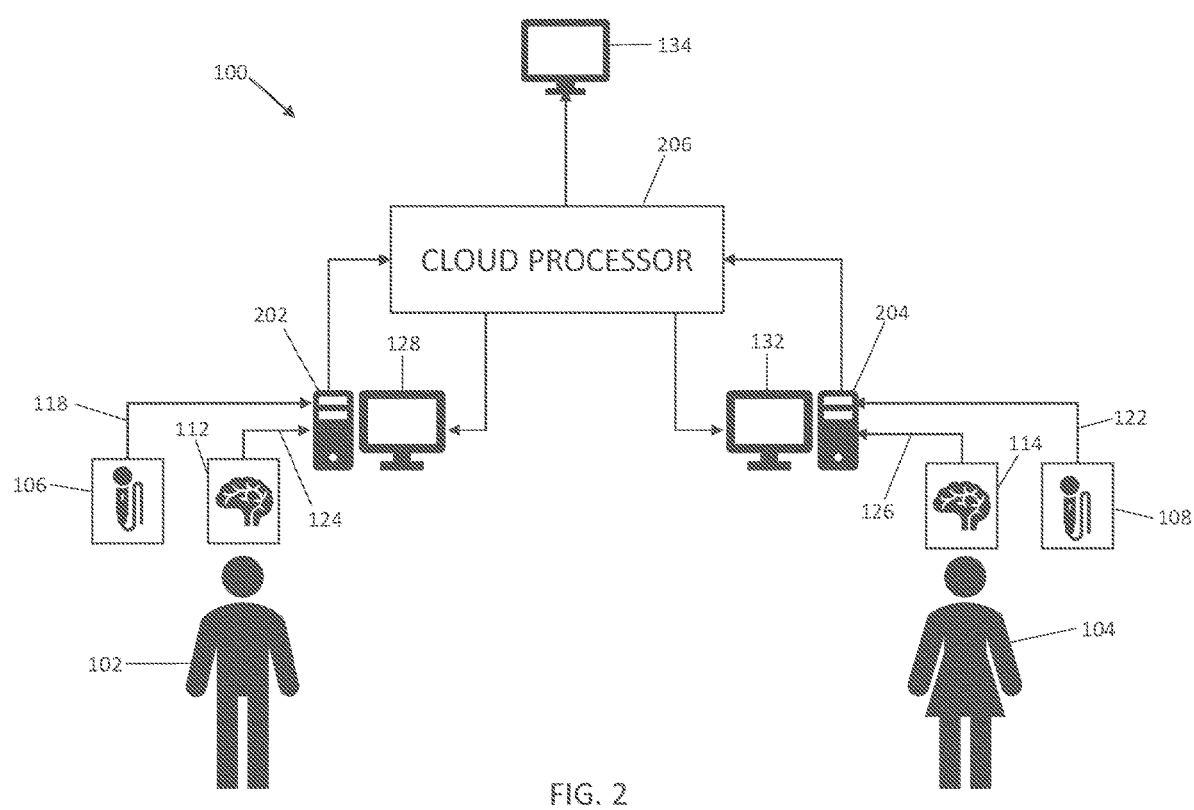
FIG. 2 depicts a simplified representation of the system depicted in FIG. 1.

Before proceeding further, it was previously noted that the processing system 116 include one or more processors. Indeed, as FIG. 2 depicts, in one embodiment, the processing system 116 is implemented using at least three separate processors—a first local processor 202, a second local processor 204, and a cloud processor 206. The first local processor 202 is collocated with the first user 102 and is coupled to receive and process the first audio signals and the first EEG signals and to transmit the first speech-related features and the first brain activity features to the cloud processor 206. The second local processor 204 is collocated with the second user 104 and is coupled to receive and process the second audio signals and the second EEG signals and to transmit the second speech-related features and the second brain activity features to the cloud processor 206. The cloud processor 206 is configured to receive and process the first and second speech-related features to determine if the speech from the first and second users exhibits positive or negative vocal entrainment. The cloud processor 206 is additionally configured to receive and process the first and second brain activity features to determine if the brain activity of the first and second users is aligned or misaligned. Thus, the audio signal and brain activity processing is implemented locally by the first and second local processors 202, 204, thereby reducing potential data loss. However, the vocal entrainment and brain activity alignment and analysis occurs centrally at the cloud processor 206.

Figure 3:
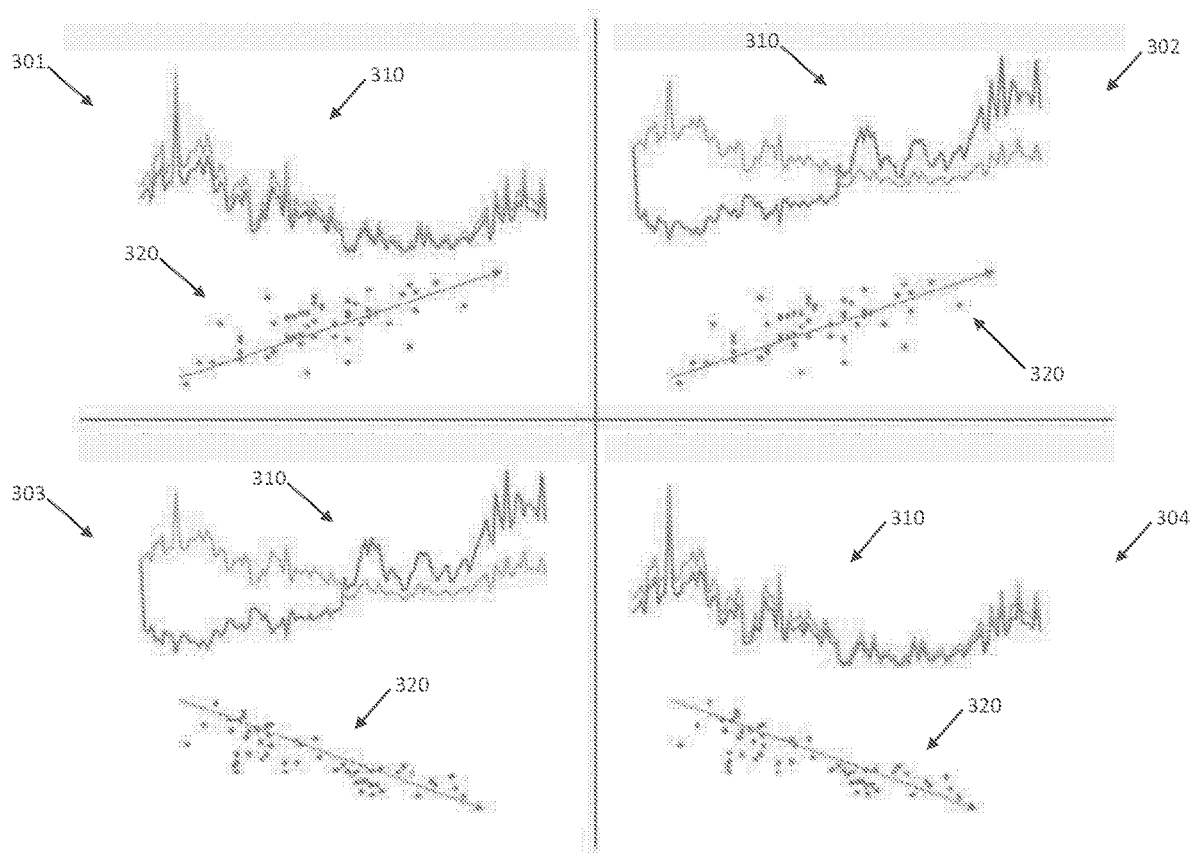
FIG. 3 depicts the type of feedback that the system depicted in FIGS. 1 and 2 can provide to a plurality of users.

Regardless of the number of processors that are used to implement the processing system 116, and as FIG. 3 depicts, the vocal entrainment and brain activity alignment and analysis can be depicted as falling into one of four different quadrants that provide indicative information regarding communicative interactions. In a first quadrant 301, brain activity and vocal signals both indicate positive alignment. In a second quadrant 302, brain activity is not aligned but vocal signals are. In a third quadrant 303, neither brain activity nor vocal signals are aligned. In a fourth quadrant 304, brain activity is aligned but vocal signals are not. In the first and third quadrants 301, 303, the first and second user's 102, 104 brain activity 310 are aligned; however, the first quadrant 301 exhibits positive vocal entrainment 320, whereas in the third quadrant 303 exhibits negative vocal entrainment 320. In the second and fourth quadrants 302, 304, the first and second user's 102, 104 brain activity 310 are misaligned; however, the second quadrant 302 exhibits positive vocal entrainment 320, whereas the fourth quadrant 304 exhibits negative vocal entrainment 320.

The information depicted in FIG. 3 is preferably provided as real-time feedback of the remote collaborative communication. To do so, the processing system 116 is additionally configured to generate display commands that cause at least one display device to render feedback images. These feedback images, which may look similar to those depicted in each of the quadrants depicted in FIG. 3, indicate if the speech from the first and second users exhibits positive or negative vocal entrainment, and if the brain activity of the first and second users is aligned or misaligned. In a particular preferred embodiment, the system 100 includes a display device associated with each user. Thus, as FIGS. 1 and 2 depict, the system 100 further includes a first user display device 128 and a second user display device 132. The first user display device 128 is collocated with the first user 102, and the second user display device 132 is collocated with the second user 104. The first and second display devices 128, 132 are both coupled to receive the display commands from the processing system 116, and to render the appropriate feedback images.

In another embodiment, as FIGS. 1 and 2 also depict, the system 100 may include a third display device 134. This third display device 134, when included, is disposed remote from the first and second user display devices 128, 132, and is also coupled to receive the display commands from the processing system 116. The third display device 134, when included, may be used by a third user (not depicted) or third party (not depicted) for training and/or debriefing purposes.

Figure 4:
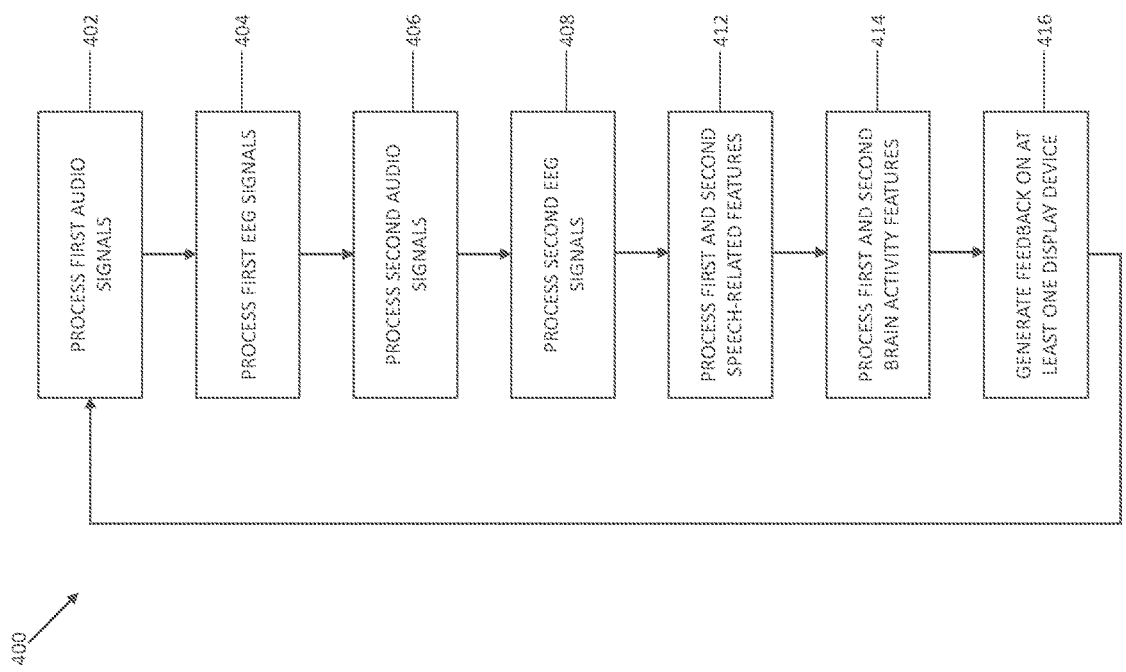
FIG. 4 depicts a process flowchart of an example process for providing real-time feedback of remote collaborative communication.

Referring now to FIG. 4, a process flowchart is depicted of an example process 400 for providing real-time feedback of remote collaborative communication. The order of operation within the process 400 is not limited to the sequential execution as illustrated in the figure, but may be performed in one or more varying orders as applicable and in accordance with the present disclosure.

The example process 400 includes processing first audio signals to extract a plurality of first speech-related features (402), and processing first EEG signals to extract a plurality of first brain activity features (404). The example process 400 also includes processing second audio signals to extract a plurality of second speech-related features (406), and processing second EEG signals to extract a plurality of second brain activity features (408).

The example process 400 includes processing the first and second speech-related features to determine if the speech from the first and second users exhibits positive or negative vocal entrainment (412), and processing the first and second brain activity features to determine if the brain activity of the first and second users is aligned or misaligned (414).

The example process 400 includes generating feedback on at least one display device (416). As noted above, this feedback indicates if the speech from the first and second users exhibits positive or negative vocal entrainment and if the brain activity of the first and second users is aligned or misaligned.

The system and method described herein provides real-time feedback of remote collaborative communication that improves joint understanding and communication between remote collaborators.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for providing real-time feedback of remote collaborative communication between a first user and a second user, the system comprising a processing system that is configured to:
   extract a plurality of first speech-related features from first audio signals generated in response to speech supplied from the first user;
   extract a plurality of first brain activity features from first electroencephalogram (EEG) signals generated in response to brain activity of the first user;
   extract a plurality of second speech-related features from second audio signals generated response to speech supplied from the second user;
   extract a plurality of second brain activity features from second EEG signals generated in response to brain activity of the second user;
   process the first and second speech-related features to determine if the speech from the first and second users exhibits positive or negative vocal entrainment;
   process the first and second brain activity features to determine if the brain activity of the first and second users is aligned or misaligned; and
   generate display commands that cause at least one display device to render feedback images that indicate (i) if the speech from the first and second users exhibits positive or negative vocal entrainment and (ii) if the brain activity of the first and second users is aligned or misaligned.

2. The system of claim 1, further comprising:
   a first microphone configured to receive the speech supplied from the first user and, in response thereto, supply the first audio signals to the processing system; and
   a second microphone configured to receive the speech supplied from the second user and, in response thereto, supply the second audio signals to the processing system.

3. The system of claim 1, further comprising:
   a plurality of first EEG sensors disposed on the first user and configured to supply the first EEG signals to the processing system; and
   a plurality of second EEG sensors disposed on the second user and configured to supply the second EEG signals to the processing system.

4. The system of claim 1, further comprising:
   a first user display device coupled to receive the display commands from the processing system; and
   a second user display device coupled to receive the display commands from the processing system.

5. The system of claim 4, further comprising:
   a third display device disposed remote from the first and second user display devices, the third display device coupled to receive the display commands from the processing system.

6. The system of claim 1, wherein the first and second speech-related features that the processing system is configured to extract comprise: pitch, speech rate, intensity, jitter, and shimmer.

7. The system of claim 1, wherein the first and second brain activity features that the processing system is configured to extract comprise: alpha power and event related potentials (ERP).

8. The system of claim 1, wherein the processing system comprises:
   a first local processor coupled to receive and process the first audio signals and the first EEG signals and to transmit the first speech-related features and the first brain activity features;
   a second local processor coupled to receive and process the second audio signals and the second EEG signals and to transmit the second speech-related features and the second brain activity features; and
   a cloud processor coupled to receive and process (i) the first and second speech-related features to determine if the speech from the first and second users exhibits positive or negative vocal entrainment and (ii) the first and second brain activity features to determine if the brain activity of the first and second users is aligned or misaligned.

9. A method for providing real-time feedback of remote collaborative communication, comprising the steps of:

processing first audio signals to extract a plurality of first speech-related features therefrom, the first audio signals being supplied in response to speech supplied from a first user;
processing first electroencephalogram (EEG) signals to extract a plurality of first brain activity features therefrom, the first EEG signals being supplied in response to brain activity of the first user;
processing second audio signals to extract a plurality of second speech-related features therefrom, the second audio signals being supplied in response to speech supplied from a second user;
processing second EEG signals to extract a plurality of second brain activity features therefrom, the second EEG signals being supplied in response to brain activity of the second user;
processing the first and second speech-related features to determine if the speech from the first and second users exhibits positive or negative vocal entrainment;
processing the first and second brain activity features to determine if the brain activity of the first and second users is aligned or misaligned; and
generating feedback, on at least one display device, that indicates (i) if the speech from the first and second users exhibits positive or negative vocal entrainment and (ii) if the brain activity of the first and second users is aligned or misaligned.

10. The method of claim 9, further comprising:
generating and supplying the first audio signals using a first microphone that is configured to receive the speech supplied from the first user; and
generating and supplying the second audio signals using a second microphone that is configured to receive the speech supplied from the second user.

11. The method of claim 9, further comprising:
generating and supplying the first EEG signals using a plurality of first EEG sensors disposed on the first user;
generating and supplying the second EEG signals using a plurality of second EEG sensors disposed on the second user.

12. The method of claim 9, further comprising:
supplying the display commands to a first user display device; and
supplying the display commands to a second user display device.

13. The method of claim 12, further comprising:
supplying the display commands to a third display device that is disposed remote from the first and second user display devices.

14. The method of claim 9, wherein the first and second speech-related features comprise: pitch, speech rate, intensity, jitter, and shimmer.

15. The method of claim 9, wherein the first and second brain activity features comprise: alpha power and event related potentials (ERP).

16. The method of claim 9, wherein:
the first audio signals and the first EEG signals are processed in a first local processor;
the second audio signals and the second EEG signals are processed in a second local processor coupled to receive and process and to transmit the second speech-related features and the second brain activity features; and
the first and second speech-related features and the first and second brain activity features are processed in a cloud processor.

17. A system for providing real-time feedback of remote collaborative communication between a first user and a second user, the system comprising
a first microphone configured to receive speech supplied from the first user and, in response thereto, supply first audio signals; and
a plurality of first electroencephalogram (EEG) sensors disposed on the first user and configured to supply first EEG signals in response to brain activity of the first user;
a second microphone configured to receive speech supplied from the second user and, in response thereto, supply second audio signals;
a plurality of second EEG sensors disposed on the second user and configured to supply second EEG signals in response to brain activity of the second user;
a processing system coupled to receive the first and second audio signals and the first and second EEG signals, the processing system configured to:
 extract a plurality of first speech-related features from first audio signals;
 extract a plurality of first brain activity features from the first EEG signals;
 extract a plurality of second speech-related features from the second audio signals;
 extract a plurality of second brain activity features from the second EEG signals;
 process the first and second speech-related features to determine if the speech from the first and second users exhibits positive or negative vocal entrainment;
 process the first and second brain activity features to determine if the brain activity of the first and second users is aligned or misaligned; and
 generate display commands that cause at least one display device to render feedback images that indicate (i) if the speech from the first and second users exhibits positive or negative vocal entrainment and (ii) if the brain activity of the first and second users is aligned or misaligned.

18. The system of claim 17, further comprising:
a first user display device coupled to receive the display commands from the processing system; and
a second user display device coupled to receive the display commands from the processing system.

19. The system of claim 17, wherein:
the first and second speech-related features that the processing system is configured to extract comprise: pitch, speech rate, intensity, jitter, and shimmer; and
the first and second brain activity features that the processing system is configured to extract comprise: alpha power and event related potentials (ERP).

20. The system of claim 17, wherein the processing system comprises:
a first local processor coupled to receive and process the first audio signals and the first EEG signals and to transmit the first speech-related features and the first brain activity features;
a second local processor coupled to receive and process the second audio signals and the second EEG signals and to transmit the second speech-related features and the second brain activity features; and
a cloud processor coupled to receive and process (i) the first and second speech-related features to determine if the speech from the first and second users exhibits positive or negative vocal entrainment and (ii) the first and second brain activity features to determine if the brain activity of the first and second users is aligned or misaligned.

* * * * *